United States Patent
Wang

(10) Patent No.: US 10,121,235 B2
(45) Date of Patent: Nov. 6, 2018

(54) DEVICE AND METHOD FOR ANALYZING THERMAL IMAGES, CONFIGURATION DEVICE AND METHOD

(71) Applicant: MISSION INFRARED ELECTRO OPTICS TECHNOLOGY CO., LTD, Hangzhou, Zhejiang (CN)

(72) Inventor: Hao Wang, Zhejiang (CN)

(73) Assignee: MISSION INFRARED ELECTRO OPTICS TECHNOLOGY CO., LTD, Hangzhou (CN)

(*) Notice: Subject to any disclaimer, the term of this patent is extended or adjusted under 35 U.S.C. 154(b) by 0 days.

(21) Appl. No.: 15/163,762

(22) Filed: May 25, 2016

(65) Prior Publication Data
US 2016/0267644 A1  Sep. 15, 2016

Related U.S. Application Data

(63) Continuation of application No. PCT/CN2014/092221, filed on Nov. 25, 2014.

(30) Foreign Application Priority Data

Nov. 25, 2013  (CN) .......................... 2013 1 0603845

(51) Int. Cl.
| | |
|---|---|
| *G06T 7/00* | (2017.01) |
| *G06K 9/46* | (2006.01) |
| *H04N 5/33* | (2006.01) |
| *G01J 5/00* | (2006.01) |
| *G06K 9/20* | (2006.01) |

(52) U.S. Cl.
CPC .......... *G06T 7/0004* (2013.01); *G06K 9/4661* (2013.01); *H04N 5/33* (2013.01); *G01J 2005/0081* (2013.01); *G06K 9/2018* (2013.01); *G06T 2207/10048* (2013.01); *G06T 2207/20021* (2013.01); *G06T 2207/30164* (2013.01)

(58) Field of Classification Search
CPC ....... G06T 7/0004; G06K 9/4661; H04N 5/33
See application file for complete search history.

(56) References Cited

U.S. PATENT DOCUMENTS

2010/0225766 A1* 9/2010 Haigh ...................... G01J 5/02
348/164

FOREIGN PATENT DOCUMENTS

| CN | 102538974 A | 7/2012 |
| CN | 103063314 A | 4/2013 |

(Continued)

OTHER PUBLICATIONS

International Search Report of PCT Patent Application No. PCT/CN2014/092221 dated Feb. 26, 2015.

*Primary Examiner* — David F Dunphy

(57) ABSTRACT

A device and method for analyzing thermal images, a configuration device and method relates to fields of thermal image detection. In the prior art, when configuring orders of analysis areas are different, parts of photographed objects to which the analysis areas correspond with the same number may be different, thereby causing a series of problems. In this invention, a reference image is controlled to be displayed in an infrared thermal image, the reference image reflects specified morphological characters of a photographed object, and a configured analysis area is associated with information related to part information. Thus, the configured analysis area is normative and easy to be understood.

17 Claims, 6 Drawing Sheets

(56) References Cited

FOREIGN PATENT DOCUMENTS

| CN | 103090976 A | 5/2013 |
| CN | 103674257 A | 3/2014 |
| CN | 103674281 A | 3/2014 |

* cited by examiner (Piror Art)　　　　　　(Piror Art)

| object information | reference image | part information | number | constituted data of analysis area | position relation of part and reference image | analysis mode | | | comment |
|---|---|---|---|---|---|---|---|---|---|
| | | | | | | analysis mode 1 | diagnosis rule 1 | | |
| | | | | | | | comparing relation | judging result | |
| photographed object 1 | constituted data of T1 | connector | J | circle | position parameter of connector in T1 | MAX | $J_{MAX} \leq 50$ | normal | |
| | | | | | | | $50 < J_{MAX} \leq 110$ | defect | connector overheating |
| | | | | | | | $J_{MAX} > 110$ | critical defect | connector severe overheating |
| | | upper portion of bushing | TS | frame | position parameter of upper portion of bushing in T1 | $TS_{MAX}$; $TX_{MAX}$; $TS_{MAX}\text{-}TX_{MAX}$ | $TS_{MAX}\text{-}TX_{MAX} \leq 1$ | normal | |
| | | lower portion of bushing | TX | frame | position parameter of lower portion of bushing in T1 | | $1 < TS_{MAX}\text{-}TX_{MAX} \leq 5$ | defect | suspected dielectric loss |
| | | | | | | | $TS_{MAX}\text{-}TX_{MAX} > 5$ | critical defect | suspected dielectric loss |
| | | ... | ... | ... | ... | ... | ... | ... | ... |
| photographed object 2 | ... | ... | ... | ... | ... | ... | ... | ... | ... |

FIG. 6

DEVICE AND METHOD FOR ANALYZING THERMAL IMAGES, CONFIGURATION DEVICE AND METHOD

CROSS REFERENCE TO RELATED APPLICATIONS

The present application is a Continuation application of PCT application No. PCT/CN2014/092221 filed on Nov. 25, 2014, which claims the benefit of Chinese patent application No. 201310603845.5 filed on Nov. 25, 2013, all the contents of which are hereby incorporated by reference.

BACKGROUND OF THE INVENTION

Field of the Invention

The invention relates to fields of thermal image detection and, more particularly, to a device and method for analyzing thermal images, a configuration device and method.

Description of the Related Art

At present, a user is necessary to depend on subjective experience to manually configure an analysis area of a specified part of a thermal image of a photographed object, to acquire an analysis result of the thermal image. A conventional setting mode of the analysis area is shown in FIG. 3(a). An analysis area selecting bar XZ3 is displayed on a display screen of a thermal image photographing device. A user can select constituted data of an analysis area, such as a point, a line, or a frame, from the selecting bar XZ3, and then can configure a position parameter of the analysis area according to a corresponding analyzing part of a thermal image of a photographed object in a displayed infrared thermal image, thus to configure one or more analysis area. According to the operating order of the user, the configured analysis areas may be automatically organized by corresponding analysis area numbers, such as S01, S02, and S03.

The analysis is performed according to an editable analysis mode of the configured analysis area. The analysis mode represents an analysis calculating rule that is used to analyze the thermal imaging data determined by the analysis area thus to acquire an analysis result, such as, in temperature analysis, to calculate a maximum temperature, an average temperature, a minimum temperature, a percentage content, and calculation relation between the analysis areas, such as temperature difference. In FIG. 3(a), S01 corresponds to a connector, and S02 and S03 correspond to an upper portion and a lower portion of a bushing, respectively. According to specified industry criteria, the analysis mode edited according to the analysis area number may be S01MAX, S02MAX-S03MAX, to acquire the analysis result of the analyzed data. Further, the analysis mode including a diagnosis rule may be editable, such as, normal: S01MAX≤50° C. and S02MAX-S03MAX≤1° C.; defect: 50° C.<S01MAX≤90° C. or 1° C.<S02MAX-S03MAX≤2° C.; critical defect: 90° C.<S01MAX or 2° C.<S02MAX-S03MAX. Thus, a state of a photographed object can be determined according to the acquired analysis result.

The prior art causes a series of problems. For example, when the configuring order of the analysis area is different, the analysis areas with the same number may correspond to different parts of a photographed object. In FIG. 3(b), a user configures the analysis areas S01, S02, and S03. However, in FIG. 3(a) and FIG. 3(b), the analysis areas with the number of S01, S03 correspond to different parts of the thermal image of the photographed object. The analysis mode and diagnosis rule edited for the analysis areas in FIG. 3(a) are not suitable for the analysis areas in FIG. 3(b). Thus, in the prior art, the user needs to reorganize the analysis mode for the analysis areas in FIG. 3(b) according to the analysis area number in FIG. 3(b), or needs to adjust the analysis area number in FIG. 3(b). The operation is complicated.

A Chinese patent with an application number of 201310010246.2, describes a method for displaying a reference image and to standardize a photographed thermal image according to the reference image. However, this patent does not describe how to distinguish the configured analysis areas. Further, the effective comparison for the specified part fails to be achieved.

Therefore, to solve the problems in the prior art, a device for analyzing thermal images is needed.

BRIEF SUMMARY OF THE INVENTION

The invention provides a device and method for analyzing thermal images, a processing device, system, and method, to solve the problems in the prior art.

This invention provides a device for analyzing thermal images, the device includes:

an acquiring unit for acquiring thermal imaging data;

a display controlling unit for displaying a reference image, an analysis area, information related to part information, and an infrared thermal image generated by the acquired thermal imaging data together, according to constituted data of the determined reference image, a position parameter of the reference image, constituted data of the analysis area, a position parameter of the analysis area, and the information related to the part information to which the analysis area corresponds, the reference image and the analysis area are displayed in the infrared thermal image, and the reference image reflects specified morphological characters of a photographed object.

A configuration device includes:

a reference image display controlling unit for controlling to display a reference image, the reference image reflects specified morphological characters of a photographed object;

a selecting unit for selecting part information;

an analysis area configuring unit for configuring a specified position relation between a specified part and/or an analysis area and a reference image, or a specified position relation between the reference image and the specified part or the analysis area;

a recording unit recording the configured specified part and/or the analysis area and the corresponding part information, which is associated with the reference image.

A method for analyzing thermal images, includes the following steps:

an acquiring step for acquiring thermal imaging data;

a display controlling step for displaying a reference image, an analysis area, information related to part information, and an infrared thermal image generated by the acquired thermal imaging data together, according to constituted data of the determined reference image, a position parameter of the reference image, constituted data of the analysis area, a position parameter of the analysis area, and the information related to the part information to which the analysis area corresponds; the reference image and the analysis area are displayed in the infrared thermal image, and the reference image reflects specified morphological characters of a photographed object.

These and other aspects and advantages of the present invention will be described with regard to the following description.

BRIEF DESCRIPTION OF THE DRAWINGS

FIG. 6 is a schematic diagram showing data stored in a storage medium in the first embodiment;

DETAILED DESCRIPTION OF THE INVENTION

For better understanding, the following described embodiments do not limit the scope of the invention and can be changed to different forms in the scope of the invention. In the invention, thermal imaging data may be thermal image AD value data, image data of an infrared thermal image, or other data generated based on the thermal image AD value data, such as array data of temperature values.

Embodiment One

Figure 1:
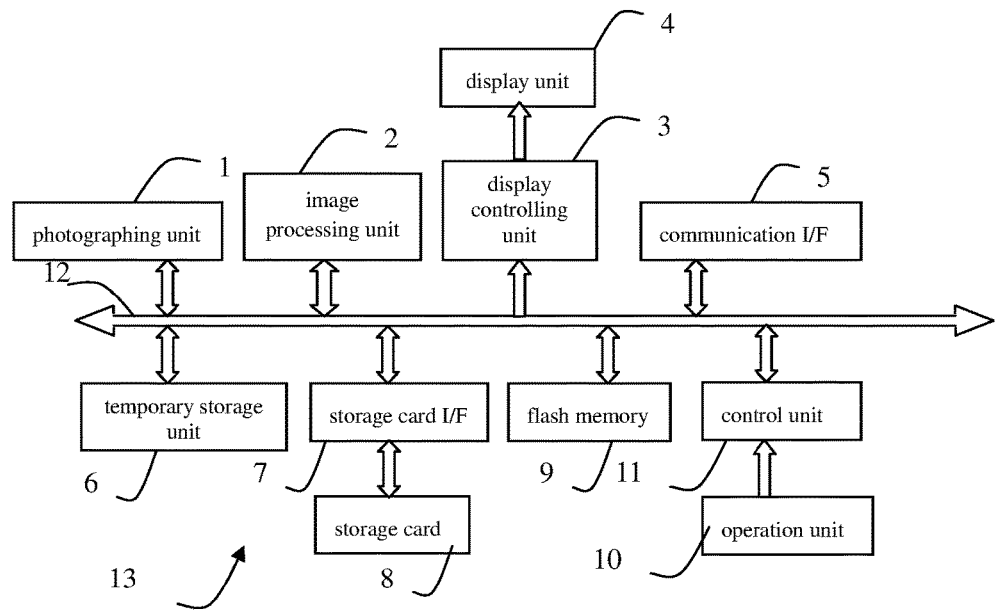
FIG. 1 is a block diagram showing a thermal imaging device 13 in a first embodiment.

In the first embodiment, a portable thermal imaging device 13 with a photographing function is as an example of a device for analyzing thermal images. The structure of the thermal imaging device 13 in the first embodiment is described according to FIG. 1.

The thermal imaging device 13 includes a photographing unit 1, an image processing unit 2, a display controlling unit 3, a display unit 4, a communication I/F 5, a temporary storage unit 6, a storage card I/F 7, a storage card 8, a flash memory 9, an operation unit 10, and a control unit 11. The control unit 11 is connected with each other unit via a control and data bus 12, and is responsible for the overall control of the thermal imaging device 13.

The photographing unit 1 includes an optical unit, a lens driving unit, an infrared detector, and a signal preprocessing circuit, which are not shown. The optical unit is composed of infrared optical lenses, and is used for focusing received infrared radiation on the infrared detector. The lens driving unit drives the lenses to perform focusing or zooming operation according to a control signal of the control unit 11, and the optical unit may also be manually regulated. The infrared detector, such as a refrigerating or non-refrigerated infrared focal plane detector, converts the infrared radiation passing through the optical unit to electrical signals. The signal preprocessing circuit, including a sample circuit, an AD conversion circuit, and a timing trigger circuit, performs signal processing such as sampling for the electric signals output from the infrared detector in a specified period. The signals are converted to digital thermal imaging data by the AD conversion circuit. The thermal imaging AD value data included in the thermal imaging data may be 14-bit or 16-bit binary data. The thermal imaging data is not limited to inherent resolution of the infrared detector, and may be lower or higher than the resolution of the infrared detector. The thermal imaging data is not limited to be acquired after specified processing for the analogue signals outputted from the infrared detector, and it may be acquired according to the digital signals outputted from the interior of the infrared detector. In the first embodiment, the photographing unit 1 is as an acquiring unit for acquiring the thermal imaging data.

The image processing unit 2 is used for performing specified processing for the thermal imaging data acquired by the photographing unit 1. The image processing unit 2 performs processing for converting data to be suitable for displaying or recording, such as modification, interpolation, pseudo-color, synthesis, compression, or decompression. For example, the image processing unit 2 may perform specified processing, such as pseudo-color processing, for the thermal imaging data acquired by the photographing unit 1, to acquire image data of infrared thermal images. The image processing unit 2 may be realized by a DSP, other microprocessors, or a programmable FPGA.

According to the control of the control unit 11, the display controlling unit 3 generates and outputs video signals generated according to the image data for displaying stored in the temporary storage unit 6, and the video signal can be displayed on the display unit 4. A liquid crystal display with an aspect ratio of 4:3 may be adopted. Preferably, to clearly display the infrared thermal image, part information, and object information, a liquid crystal display with an aspect ratio of 16:9 may be adopted.

The communication I/F 5 may be an interface for connecting and exchanging data between the thermal imaging device 13 and an external device according to communication specification such as USB, 1394, or network. The external device may be a personal computer, a server, a PDA (personal digital assistant device), other thermal imaging devices, or a visible-light photographing device.

The temporary storage unit 6, such as a RAM or DRAM volatile storage, is a buffer storage for temporarily storing the thermal imaging data output from the photographing unit 1, and is a working storage of the image processing unit 2 and the control unit 11 for temporarily storing the processed data of the image processing unit 2 and the control unit 11.

The storage card I/F 7 is used as an interface of the storage card 8. The storage card I/F 7 is connected with the storage card 8 as a rewritable non-volatile storage, which can be detachably installed in a groove of the main body of the thermal imaging device 13 and can record the data such as the thermal imaging data according to the control of the control unit 11.

The flash memory 9 stores control programs and different kinds of data used in different control.

Figure 2:
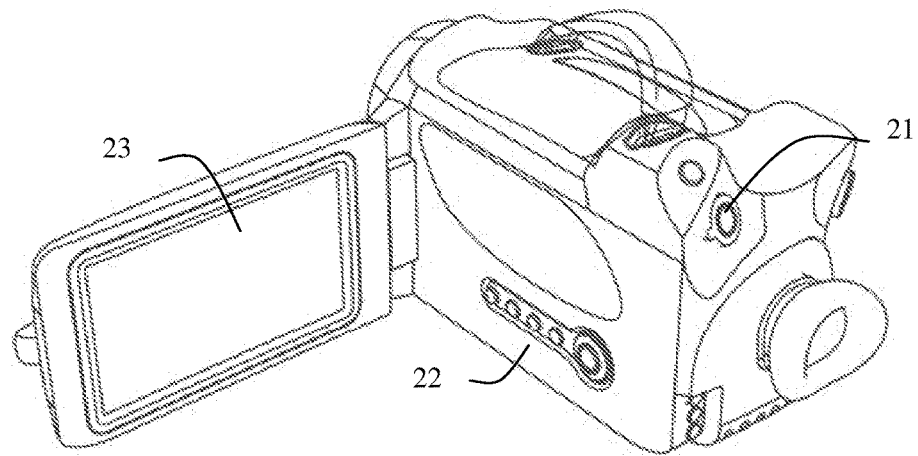
FIG. 2 is an outline diagram showing a thermal imaging device 13 in the first embodiment.
Figures 3A, 3B:
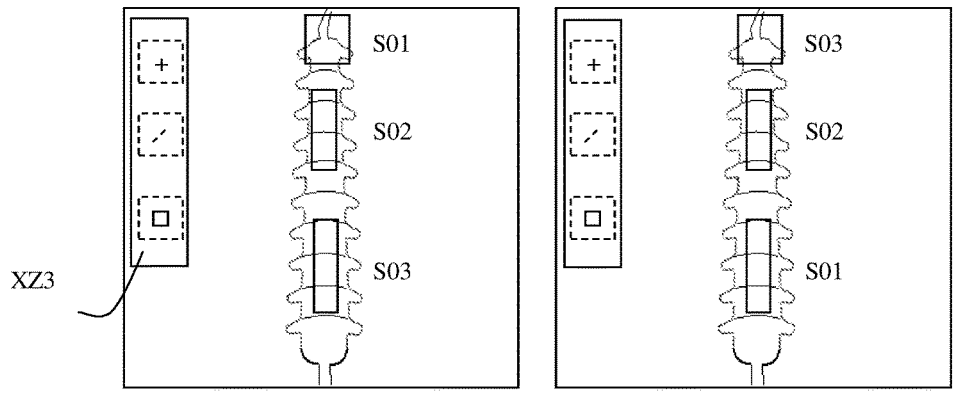
FIGS. 3(a) and 3(b) show examples of an analysis area selecting bar and configured analysis areas in the prior art.

The operation unit 10 is used for a user to perform different operation. The control unit 11 executes the corresponding program according to an operation signal of the operation unit 10. The operation unit 10 is described according to FIG. 2. The operation unit 10 may include a record key 21 and an analysis key 22. However, the invention is not limited thereto. A touch screen 23 or a phonic unit (not shown) may be used for realizing related operation.

The control unit 11 controls the whole action of the thermal imaging device 13, the storage medium such as the flash memory 9 stores the control programs and different data used in different control. A CPU, a MPU, a SOC, and programmable FPGA may realize the control unit 11. The image processing unit 2 and the display controlling unit 3 may be a processor integrally formed with the control unit 11.

The control unit 11 as a reference image display controlling unit is used for displaying a reference image with a specified position parameter (such as a specified position, a specified dimension) in an infrared thermal image. The reference image reflects specified morphological characters of a photographed object.

In one example, constituted data of the reference image may be prestored in a storage medium, a thumbnail of the constituted data of the reference image may be displayed for users to select, and the constituted data of the reference image may be determined according to the selection of a user. In another embodiment, the object information and the constituted data of the associated reference image may be prestored in the storage medium, and the constituted data of the reference image may be determined by the selection of the object information. According to a position parameter of a reference image in an infrared thermal image, the reference image and the infrared thermal image are synthesized according to a specified transparent ratio, thereby allowing to display the reference image with the specified position parameter in the infrared thermal image. Further, according to the image data of the reference image, the specified processing such as selective pseudo-color may be performed for the thermal imaging data, to acquire the infrared thermal image reflecting the reference image. The position parameter of the reference image located in the infrared thermal image may be acquired according to the position parameter inputted by a user, a defaulted position parameter, the position parameter stored in association with the constituted data of the reference image, or in a self-adapted display mode.

Preferably, the control unit 11 as a display controlling unit is used for displaying the reference image, the analysis area, information related to part information, and the infrared thermal image generated by the acquired thermal imaging data together, according to the constituted data of the determined reference image, the position parameter of the reference image, the constituted data of the analysis area, the position parameter of the analysis area, and the information related to the part information to which the analysis area corresponds. The reference image and the analysis area are displayed in the infrared thermal image, and the reference image reflects specified morphological characters of a photographed object.

The control unit 11 as an analysis area setting unit is used for setting an analysis area. Preferably, the analysis area corresponds to the information related to the part information, which may be stored in a specified area in the temporary storage unit 6.

The part information may include component information, photographing part information, and angle information. Preferably, the part information may at least include the component information, the photographing part information, or the component and photographing part information. In one example, the part information may be the component information of a photographed object, such as a connector, a brushing, or a base. Further, the part information may be a subdivision of component types, such as a connector may be divided into a T-connector, a splicing sleeve, and a parallel groove clamp. Preferably, the part information may include different classification information suitable for industry application, such as a voltage level or a phase. In another example, the part information may be photographed part information of an object, such as an upper part, a middle part, or a lower part. In another example, the part information may be a combination of the component information and the photographing part or angle information, such as an upper part of a brushing, or a lower part of a brushing. The different part information may be prepared in advance for different analysis and comparison of parts. The different part information may be prepared in advance according to needs. The part information may include texts, letters, icons, digits, numbers, or a combination thereof. An identifier of the part information may be the identifier representing the part information, such as words, letters, icons, digits, numbers, or a combination thereof, thereby allowing the users to distinguish the part information represented by the identifier.

The information related to the part information may be the part information and/or a part number corresponding to the part information (called part number in brief hereinbelow). The part number may be associated with the part information in advance, the part information may include the part number, or the part number may be generated according to the part information. Preferably, the part number uniquely corresponds to the part information, such as representing identity information of the part information, thereby capable of editing the analysis mode according to the part number. When the part number corresponding to the part information is not unique, the analysis area is suitable to be associated with the part information, and the analysis mode may be edited according to the part information in advance. Preferably, the part information and/or the part number may be as the analysis area number, or a constituted portion of the analysis area number.

To acquire the analysis area corresponding to the reference image and the part information corresponding to the analysis area, there are various embodiments.

Figure 4:
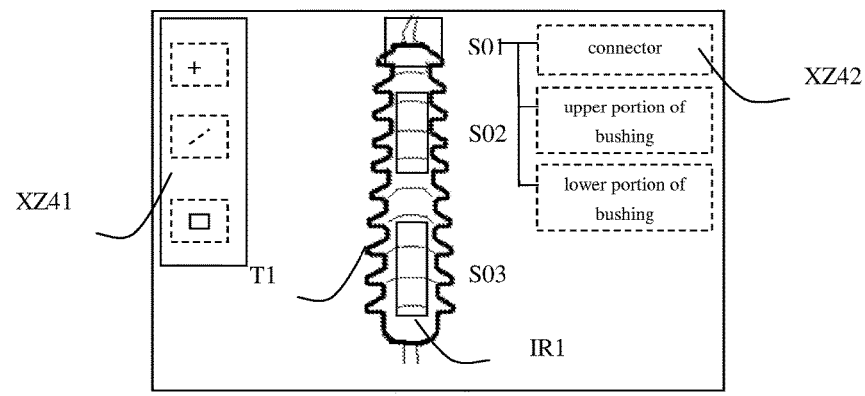
FIG. 4 is an example of an analysis area setting bar, a part information selecting bar, and configured analysis areas in one embodiment.

In one embodiment, the reference image (or the reference image and the infrared thermal image) is displayed, and the analysis area is configured and the part information corresponding to the analysis area is selected. The embodiment is described according to FIG. 4. A reference image T1 (or the reference image T1 and an infrared thermal image) is displayed. According to the recognition of the reference image T1 (or a thermal image IR1 of an object), a user selects the constituted data of the analysis area, such as "frame", from a setting bar XZ41, configures the position parameter of the analysis area, sets the analysis areas S01, S02, and S03 on the reference image T1 (or in the infrared thermal image), selects the analysis area S01, and selects the corresponding part information from a setting bar XZ42. The analysis areas S01, S02, and S03 are recorded in association with the correspondingly selected part information to a specified area of the temporary storage unit 6. Thereby, the analysis areas S01, S02, and S03 may correspond to the correspondingly selected part information, respectively.

In another embodiment, the reference image (or the reference image and the infrared thermal image) and the part information for selection are displayed. According to the selected part information, the analysis area may be configured according to the position parameter configured by a user. When the part information is not associated with the constituted data of the analysis area, the defaulted constituted data such as "frame" may be used, which is suitable for the constituted data of the analysis area to which all part information corresponds. Preferably, according to the constituted data of the analysis area associated with the selected part information, the analysis area may be configured according to the position parameter configured by the user. The part information and the constituted data of the associated analysis area may be prestored in the storage medium. The selected part information may be associated with the correspondingly configured analysis area. The "frame" may not be adopted, and "point" or "line" may be adopted.

In one preferred embodiment, the configured analysis area, the part information and/or the part number to which the analysis area corresponds, and the reference image may be associated and recorded, such as stored in the storage card 8 for subsequent use. Further, according to the part information and/or part number, the corresponding analysis mode may be written, associated and recorded. Preferably, the object information and one part or all of the above information may be associated and recorded, for subsequent use. A table of the association information of the object information may be shown as FIG. 6. The thermal imaging device 13 may be as an example of a configuration device. The configuration may be finished on a computer. During configuration, a configuration mode of a specified part to which the part information corresponds is similar to that of the analysis area. In one embodiment, the specified part is equal to the analysis area, and in another embodiment, they may be different.

The part information and/or the part number is used for arranging the analysis mode, and during analysis, the analysis may be performed according to the arranged analysis mode. The part number may be prepared in advance, such as stored in association with the part information. In another embodiment, the part number may be generated according to the part information, and the analysis mode may be prearranged according to the part information or according to the generated part number. For example, the part number may be generated according to the Chinese phonetic alphabet abbreviation of the part information to which the analysis area corresponds, and the analysis mode may be prearranged according to the Chinese phonetic alphabet abbreviation of the part information. In FIG. 8(*b*), "J", "TS", and "TX" may be generated according to the abbreviation, such as the Chinese phonetic alphabet abbreviation of the part information "connector", "upper portion of bushing", and "lower portion of bushing", respectively, and the analysis mode may be prearranged according to the Chinese phonetic alphabet abbreviation related to the part information. The part number "J", "TS", and "TX" uniquely corresponds to the part information "connector", "upper portion of bushing", "lower portion of bushing", respectively (such as one by one in the embodiment). Thus, the analysis mode may be arranged according to the part number. Further, when there is no part number, or the part number is not unique, the analysis mode and diagnosis rule may be prearranged according to the part information.

Preferably, the corresponding relation between the part number and the part information is unique. Thus, the analysis mode may be arranged according to the relatively simplified part number. In one example, the analysis mode may be arranged according to the part information and/or the part number. In another example, the analysis mode may be arranged according to the analysis area number including the part information and/or the part number.

In one example of uniqueness, the part number uniquely corresponds to the part information. For example, a part number of specified part information only corresponds to the specified part information, while the specified part information may correspond to a plurality of different part numbers, such as corresponding to numbers reflecting different applied conditions such as day or night distinguished by time.

In one preferred example of uniqueness, the corresponding relation between the part number and the part information is mutual unique (one by one). That is, specified part information only corresponds to a specified part number, and the specified part number also only corresponds to the specified part information. Thus, the analysis mode is more convenient to be edited according to the part number. For example, for the same reference image, the part information uniquely corresponds to one part number, and one part number uniquely corresponds to the part information.

When the processing such as analysis is not affected, there may be a plurality of the same part numbers corresponding to the same part information. For example, for a photographed object including a plurality of the same components, if the processing such as analysis of these components is the same, and the configuring order of the analysis area has nothing to do with the analysis, the analysis areas configured according to these components may have the same part number corresponding to the same part information.

In one detailed embodiment, the uniqueness may be understood for photographed objects in a specified range. The specified range may be limited to the photographed objects with the same model, of the same type, or within the same jurisdiction, according to the application of users, and the range of the uniqueness may be set according to needs.

In another embodiment, the different part information corresponds to different constituted data of the analysis area, and the different constituted data of the analysis area may be the performance of a property such as different shapes "circle", "frame", or "triangle". The analysis mode may be arranged according to the property such as different shapes of the analysis area.

In one preferred mode, the control unit 11 as an analysis area setting unit may set an analysis area according to a specified position relation between a specified part to which the part information corresponds and a reference image. The analysis area may represent the specified component or part to which the part information corresponds. The configured analysis area is associated with the information related to the part information.

The specified position relation may be the position parameter of the specified part located in the reference image, such as a place, or further including a dimension, a rotating angle, or a combination thereof. For example, the position parameter of the reference image and the position parameter of the specified part located in the infrared thermal image, respectively, may be prepared in advance, and the reference image and the specified part have the specified position relation.

Figure 5:
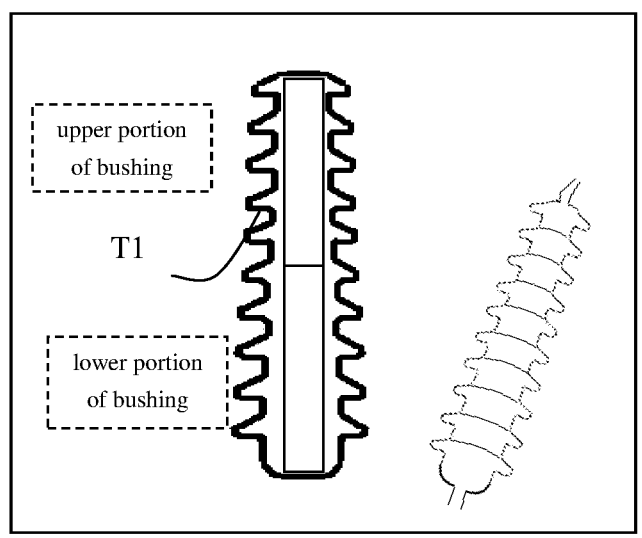
FIG. 5 is an example of analysis areas to which configured part information corresponds in another embodiment.

The specified position relation between the reference image and the specified part may be prepared in advance, or may be acquired according to a processing rule. For example, the position parameter of the specified part (or the analysis area) located in the reference image may be acquired according to the processing for the reference image, and the part information to which the different processing rules correspond may be prepared in advance. For example, two frames in FIG. 5, representing the position parameters of an upper portion of a bushing and a lower portion of the bushing, respectively, may be acquired according to the processing rule (such as, to calculate an inscribed rectangle of the reference image T1 and to divide the rectangle into two parts) for the reference image T1, and the part information "upper portion of bushing" and "lower portion of bushing" to which the processing rule corresponds may be prepared in advance. The specified part may be located outside of the reference image.

The position parameter (such as a place, a dimension, a rotating angle, or a combination thereof) of the analysis area located in the infrared thermal image (or the thermal imaging data) may be acquired according to various embodiments.

In one example, according to the specified position relation between the specified part and the reference image, the position parameter of the specified part located in the infrared thermal image may be acquired according to the position parameter of the reference image located in the infrared thermal image, and then the analysis area may be configured according to the specified part. The position parameter of the specified part located in the infrared thermal image may be first configured, and then according to the specified position relation between the reference image and the specified part and the position parameter of the specified part located in the infrared thermal image, the position parameter of the reference image located in the infrared thermal image may be acquired.

The control unit 11 configures the analysis area according to the specified part having the specified position relation with the reference image. For example, the position parameter of the reference image and the position parameter of the specified part located in the infrared thermal image, respectively, may be prepared in advance, and then the position parameter of the analysis area located in the infrared thermal image may be configured according to the position parameters.

In one embodiment, the analysis area is equal to the specified part. For example, the specified part also represents the analysis area to which the part information corresponds.

In another embodiment, the analysis area may be different from the specified part. For example, the analysis area may be a circle, while the specified part may be a base point, and the analysis area may be configured by using the base point as a circle center, thus to achieve the purpose of flexible settings.

In one preferred mode, a storage medium stores the constituted data of the reference image and the association information corresponding to the constituted data of the reference image. The association information at least includes the part information, the constituted data of the analysis area corresponding to the part information, and the specified position relation between the specified part corresponding to the part information and the reference image. The analysis area may be configured according to the specified part that corresponds to the part information and has the specified position relation with the reference image.

In another preferred mode, an object information selecting unit is used for selecting object information, such as selecting based on the object information stored in a storage medium. Preferably, the storage medium stores the object information, the constituted data of the reference image associated with the object information, the part information, and the specified position relation between the specified part corresponding to the part information and the reference image. The analysis area may be configured according to the position parameter of the specified part. Preferably, the part information is associated with the constituted data of the analysis area.

In another preferred mode, an object information selecting unit is used for selecting the object information based on the object information stored in the storage medium. The storage medium is used for storing the object information, the constituted data of the reference image associated with the object information, the part information, the constituted data of the analysis area corresponding to the part information, and the specified position relation between the specified part corresponding to the part information and the reference image. The control unit 11 determines the constituted data of the reference image and the constituted data of the analysis area, according to the constituted data associated with the selected object information. If the specified part is equal to the analysis area, the acquired reference image and the configured analysis area may satisfy the specified position relation.

Referring to FIG. 6, the object information, the constituted data of the reference image, the part information, the part number, the constituted data of the analysis area, the position relation between the part and the reference image, and the analysis mode, stored in the storage medium may be described. The storage medium may be a storage medium in the thermal imaging device 13, such as a non-volatile storage medium i.e. the flash memory 9 or the storage card 8, or a volatile storage medium i.e. the temporary storage unit 6, or may be other storage mediums wiredly or wirelessly connected with the thermal imaging device 13, such as a storage medium in other devices wiredly or wirelessly connected with the communication I/F 5, i.e. another storage device, a thermal imaging device, or a computer, or a storage medium of a network destination.

The object information is the information related to the photographed object, and may include the identity information related to the photographed object. The generated object indicating information may facilitate the users to distinguish the corresponding photographed object, such as the information representing the self-property of the photographed object, i.e. a place, a type, or a number, in electric power industry. In one example, the object information may include the information representing a place (such as a substation, an equipment area), a type (the type may be a transformer or a switch; a voltage level, a model, a manufacturer, or a manufacturing batch), and a phase (such as A phase, B phase, C phase), of the photographed object. In another example, the object information only includes the type or model information of the photographed object. In another example, the object information may further include an attribution unit, a voltage level, an importance grade, a manufacturer, performance and characteristics, a passed photographing or repairing record, a manufacturing date, a service life, an ID number, or a combination thereof, related to the photographed object. In other examples, the object information may include the part information. The object information may be different according to different applications.

The (at least one piece of) object information and the above information associated with the object information may be stored in the storage medium. Thus, a user can conveniently determine the constituted data of the reference image by selecting the object information according to the photographed object on the scene, thereby facilitating the operation.

The constituted data of the reference image is used for acquiring the reference image, and it may be vector image data or lattice data, or may include the vector image data and the lattice data at the same time.

The constituted data of the analysis area is used for acquiring the analysis area, and it may be vector image data or lattice data, or may include the vector image data and the lattice data at the same time. Preferably, as shown in FIG. 6, the constituted data of the analysis area associated with the part information may be prepared in advance. However, in other examples, the universal constituted data of the analysis area may be adopted. For example, for all of the part information, the constituted data of the analysis area may be defaulted to "frame", and the constituted data of the analysis area to which each part information corresponds may not be prepared in advance.

The specified position relation between the part and the reference image may store the position parameter of each specified part located in the reference image. As shown in FIG. 6, the position parameter includes a position and dimension of the specified part or a rotating angle, and the analysis area corresponding to the part information may be configured according to the position parameter. In other preferred examples, only the position may be stored, the analysis area may be configured according to the position, and the dimension of the configured analysis area may be acquired according to a defaulted value.

In another preferred example, the position parameter of the reference image and the position parameter of the specified part located in the thermal imaging data (or the infrared thermal image), respectively, may be stored. Thus, according to the position parameters, the position parameter of the reference image and the position parameter of the analysis area located in the infrared thermal image may be configured.

Further, the control unit 11 as a thermal image analyzing unit is used for analyzing the thermal imaging data according to the analysis mode, based on the configured analysis area. Preferably, the acquired analysis result is associated with the part information, and the part information may be acquired according to the information related to the part information associated with the analysis area.

In the embodiment, the thermal imaging data is converted to temperature values for analysis. However, the invention is not limited thereto. For example, the thermal imaging data may be converted to radiation energy values, gray values, or radiation rate values, for analysis. The analysis for the acquired thermal imaging data is not limited to the single frame of the thermal imaging data. For example, the analysis may be performed for the multi-frame thermal imaging data stored in the temporary storage unit 6, or may be performed for one frame of the thermal imaging data acquired after integral calculation for the multi-frame thermal imaging data. This invention is also suitable for the above conditions. The persons having ordinary skill in the art know the detailed analysis for the thermal image. Therefore, the description is omitted.

In one example, a universal analysis mode may be adopted, which is suitable for all configured analysis areas.

Preferably, the analysis mode may be acquired based on the analysis mode associated with the part information, and the analysis mode associated with the part information may be prepared in advance. In one example, the part information and the associated analysis mode may be prestored in the storage medium, which may be used for the analysis area configured corresponding to the part information. In another example, the part information and the associated constituted data of the analysis area, and the analysis mode corresponding to the constituted data of the analysis area may be prestored in the storage medium, which may be used for the analysis of the analysis area acquired by the constituted data of the analysis area. In this condition, the same part information may be associated with the constituted data of the analysis area of different applications. In another example, the analysis mode may also be the analysis mode associated with the specified part corresponding to the part information.

In FIG. 6, the analysis mode includes an analysis mode 1 and a diagnosis rule 1 or may only include the analysis mode 1. Thermal image analyzing unit can acquire the analysis result of the analyzed values acquired according to the analysis mode 1, and may acquire the analysis result of the analyzed values and/or the diagnosis result according to the analysis mode 1 and the diagnosis rule 1. Preferably, the diagnosis rule 1 includes "judging result" and "comments". The analysis and diagnosis result and the corresponding part information may be shown. The diagnosis rule 1 may not include "diagnosis result" and "comments", and the diagnosis result may be shown. For example, since conditions for triggering an alarm such as "sound, light, electricity" may be replaced, the diagnosis result may be reflected as "sound, light, electricity" and other alarm signals.

Further, the thermal image analyzing unit includes a diagnosing unit for analyzing according to a specified analysis mode and acquiring an analysis result. The analysis mode includes a diagnosis rule, and the analysis result includes a diagnosis result. Preferably, the diagnosis may be performed according to the analysis mode acquired according to the analysis mode associated with the part information. For example, according to the analysis mode, the analysis and diagnosis may be performed for the analysis area corresponding to the part information.

Further, the control unit 11 as a presenting unit is used for presenting the part information and the corresponding analysis result. The presenting mode of the part information and the analysis result may be a display mode, while the presenting mode is not limited to display, it may be other modes of "sound, light, electricity, vibration", such as a sound alarm, or a mode by transmitting the part information and the analysis result to a specified destination. A user can know a defect of the part according to the presented analysis result. The presenting mode of sound, light, and electricity may be adopted. When the analysis mode is with the diagnosis rule, the part information may be not presented, and the alarm may be given according to a specified condition.

The detailed operation and control flows of the first embodiment are described hereinbelow. The scene may be to photograph a photographed object in a substation, and a table in FIG. 6 is stored in the flash memory 9. When the power is on, the interior circuit of the control unit 11 is initialized, and then a photographing mode is entered. That is, the photographing unit 1 acquires the thermal imaging data, the image processing unit 2 performs specified processing for the thermal imaging data acquired by the photographing unit 1, the processed data is stored to the temporary storage unit 6, and the control unit 11 controls the display controlling unit 3, to allow the display unit 4 to dynamically display the infrared thermal image in a dynamic image mode and the selecting bar of the object information.

Figure 7:
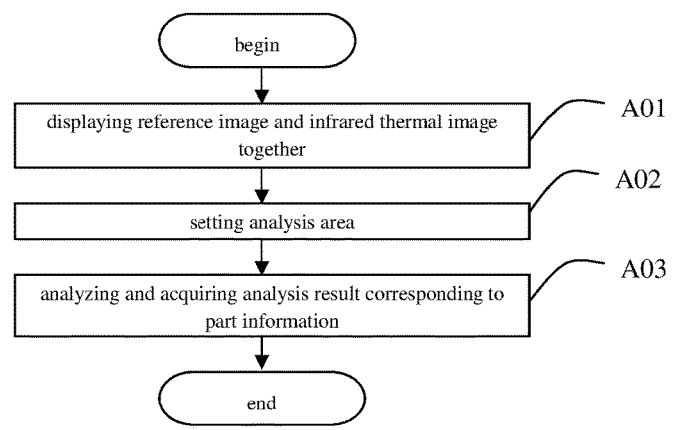
FIG. 7 is a flow chart showing the configuration and analysis of the analysis area in the first embodiment.

FIG. 8 is a schematic diagram showing display interfaces of configuration and analysis of the analysis area of the thermal image of the photographed object. Referring to FIG. 7, the control steps of the first embodiment are described.

In step A01, in the photographing mode, the display unit 4 displays the dynamic infrared thermal image, and displays an object information selecting bar XZ81. A user can turn a page to see the object information (such as by adjusting a scroll bar). The displayed object information may usually only include information of a place, a type, and a phase of the photographed object, while it is not necessary to display all information of the object information.

Preferably, a widescreen (such as a widescreen of 16:9) may be adopted. Therefore, the indicating information such as the object information may be displayed with the infrared thermal image together, without overlapping the infrared thermal image (usually 4:3). In addition, the object information may be superimposed on the infrared thermal image.

Figure 8A:
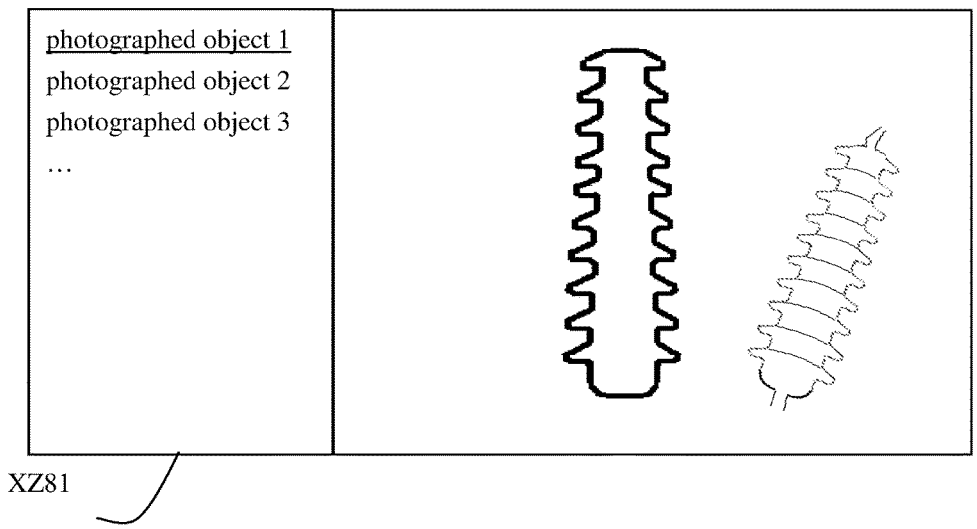
FIGS. 8 (a), 8(b) and 8(c) show examples of display interfaces in the first embodiment.

When a user selects "photographed object 1", according to the constituted data of the reference image stored in the storage medium (the constituted data of T1 associated with "photographed object 1"), the reference image T1 is displayed as shown in FIG. 8(a). The position parameter of the reference image T1 located in the infrared thermal image may be acquired according to the position parameter inputted by a user, or a defaulted position parameter, or the associated position parameter, or in a self-adapted display mode.

Figure 8B:
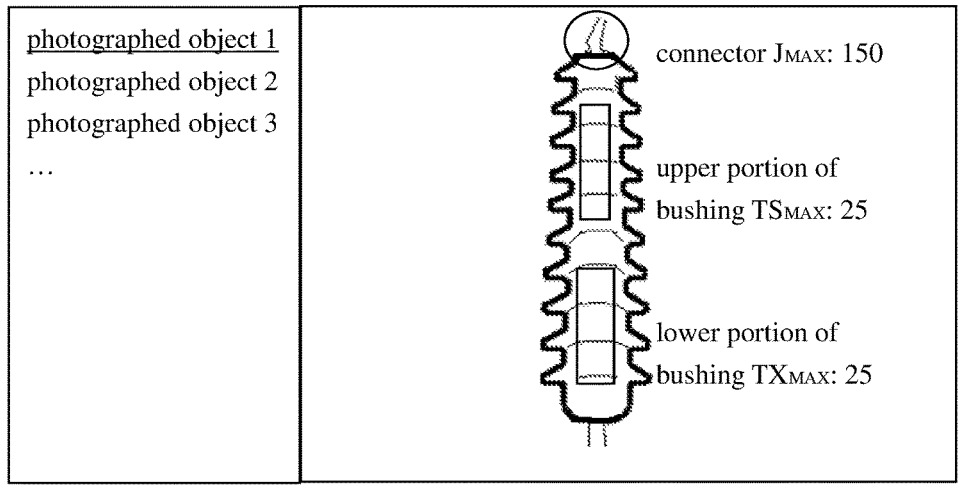
Figure 8C:
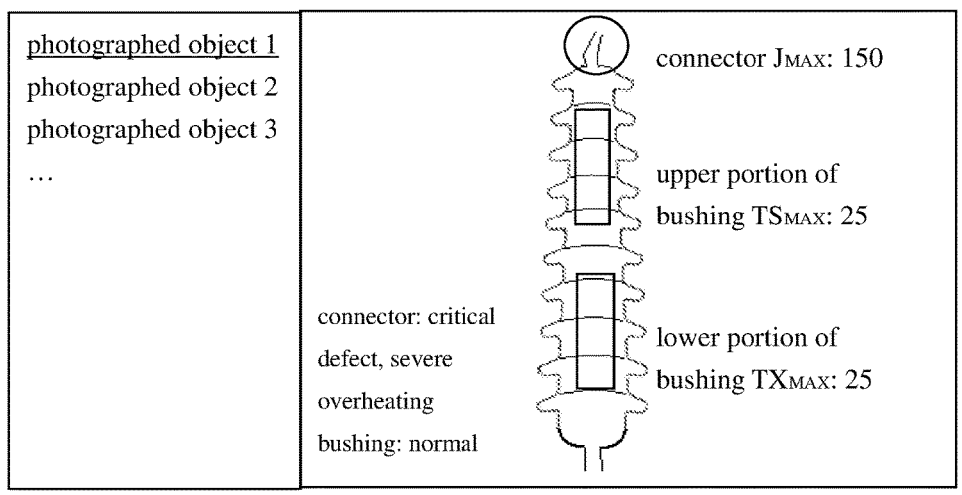

In another example, the analysis area and/or the corresponding part information may be displayed at the same time, such as displayed in the corresponding position in the infrared thermal image, such as the analysis area and/or the corresponding part information in FIG. 8(c).

In step A02, a user can press the analysis key when the thermal image of the photographed object is matched with the reference image T1 according to the reference of the reference image T1. The control unit 11 configures the analysis area, and configures the analysis areas J, TS, and TX, according to the constituted data of the analysis area associated with the reference image T1. The position parameter of the analysis area may be configured according to the position parameter of the reference image T1 located in the infrared thermal image, and the specified position relation between the reference image T1 and the specified part, to which a connector, an upper portion of a bushing, and a lower portion of the bushing correspond, respectively.

In step A03, the analysis is performed, and the analysis result is acquired. The analysis is performed for the analysis area according to the respective corresponding analysis mode, based on the configured analysis areas J, TS, and TX, and the analysis result is acquired.

The analysis result may be presented subsequently. For example, the analysis result may be shown as FIG. 8(b), the part information and the analysis result of the corresponding analyzed values "connector $J_{MAX}$: 150", "upper portion of bushing $TS_{MAX}$: 25", "lower portion of bushing $TX_{MAX}$: 25" may be shown. Since the part information and the part number may be shown, the users feel more intuitive. Preferably, when the analysis mode includes the diagnosis rule, the analysis result with the diagnosis result may be further analyzed. As shown in FIG. 8(c), the part information and the analysis result of the corresponding analyzed values "connector $J_{MAX}$: 150", "upper portion of bushing $TS_{MAX}$: 25", "lower portion of bushing $TX_{MAX}$: 25" may be shown, and further the diagnosis result "connector: critical defect, serious overheating", "bushing: normal" may be shown. Thus, the users feel more intuitive.

When the analysis result is presented, the reference image T1 may be shown or not. The shown example is FIG. 8(b), and the example of not shown is FIG. 8(c).

Preferably, one or all of the part information, the analysis result, and the diagnosis result may be shown adjacent to the corresponding analysis area, such as the upper, lower, left, and right side of the analysis area, such as the right side of the analysis area in FIG. 8(b), facilitating the users to understand.

The processing steps are not limited to the above. In another example, the configuration of the analysis area may be performed before the display of the reference image, the position parameter of the analysis area located in the infrared thermal image may be determined first, and then the position parameter of the reference image located in the infrared thermal image may be determined according to the position relation between the analysis area and the reference image.

The display controlling unit displays the reference image, the analysis area, the information related to the part information, and the infrared thermal image generated by the acquired thermal imaging data together. There are multiple processing steps for determining the constituted data of the reference image, the position parameter of the reference image, the constituted data of the analysis area, the position parameter of the analysis area, and the part information to which the analysis area corresponds.

The control unit 11 as a recording unit is used for recording the specified recorded information in association with the thermal imaging data and/or the data acquired after specified processing for the thermal imaging data. For example, the part information and the associated analysis result may be associated and recorded with the acquired thermal imaging data. The specified recorded information may include one or more of the following:

1) the information related to the selected object information;

2) the information related to the part information;

3) the information related to the analysis area; such as the information associated with part information corresponding to the analysis area, the constituted data of the analysis area and the position parameter of the analysis area, or the position parameter of the corresponding specified part;

4) the information related to the analysis mode; such as the analysis mode used for analyzing the analysis area corresponding to the part information;

5) the analysis result; such as the analysis result acquired by analyzing the analysis area corresponding to the part information.

Preferably, the 1), 2) and 3) may be recorded. Further, all of the above may be recorded, which may be applied to the follow-up batch processing in a variety of ways.

In another example, the record may be performed before the step A02 and A03. For example, a user may send a record instruction and configure the analysis area. For example, the selected object information, the analysis area and the associated part information, and the thermal imaging data may be associated and recorded to generate a thermal image document, facilitating the subsequent analysis.

The recorded thermal imaging data and/or the data acquired after specified processing for the thermal imaging data, may be the thermal imaging data (frame) acquired according to the signals read by an infrared detector at the moment of responding to the record instruction, may be the specified thermal imaging data (frame) in the multi-frame thermal imaging data stored in the temporary storage unit 6 at the moment of responding to the record instruction, may be the data acquired after specified processing for the thermal imaging data in the above conditions (the specified processing may be modification, interpolation, pseudo-color, temperature value conversion, pixel reduction, compression, analysis for acquiring the analysis result, or a combination thereof), may be a specified amount of multi-frame thermal imaging data that is recorded, may be the thermal imaging data (frame) acquired after specified processing for the specified amount of the multi-frame thermal imaging data, such as one frame of the thermal imaging data acquired after integral calculation for the multi-frame thermal imaging data stored in the temporary storage unit 6, or may be one or more infrared thermal image acquired according to the above conditions, such as the temperature value of each pixel acquired at the time of recording the thermal imaging data and the image data of the infrared thermal image.

In detail, in one embodiment, in response to the record instruction of the operation unit 10, the control 11 controls the infrared detector to read signals, to acquire the thermal imaging data and to perform the corresponding processing to acquire the analysis result, the image processing unit 2 is allowed to perform specified compression for the thermal imaging data or perform specified processing such as modification, interpolation before compression for the thermal imaging data, the specified recorded information (including the analysis result) in the temporary storage unit 6 is associated with the compressed thermal imaging data thus to generate the thermal image document that is recorded to the storage card 8, and the processing is end. In addition, the compression may be performed after the information is attached.

Preferably, a document name of the thermal image document may be generated according to the selected part information, to facilitate the subsequent analysis. Preferably, the recording unit includes a document name generating unit for generating a document name of the thermal image document. The generated document name of the thermal image document includes the information related to the part information. For example, when the part information such as connector, upper portion of bushing, and lower portion of bushing, is selected, the generated document name of the thermal image document may be connector-upper portion of bushing-lower portion of bushing.jpg. Further, the photographing time "20130207" may be combined to generate the document name, such as connector-upper portion of bushing-lower portion of bushing-20130207.jpg. Preferably, when the object information is selected, the document name of the thermal image document may be generated according to the selected object information.

In addition, the specified recorded information may be recorded to an information document or index document related to the thermal image document. The control unit 11 may generate the information document or the index document. The substance of the associated record is to record the part information and the information related to the analysis area for facilitating the subsequent batch analysis.

The single frame thermal image document is not limited. In another embodiment, the thermal image recording unit continuously records the acquired thermal imaging data, to generate the multi-frame thermal image document including a plurality of frames. When there is the record instruction of associating the specified recorded information, the control unit 11 controls the infrared detector to read signals to acquire the thermal imaging data for compression, to allow the specified recorded information in the temporary storage unit 6 to be associated and recorded with the compressed thermal imaging data to the multi-frame thermal image document. The frame sequence position of the thermal imaging data may be associated with the specified recorded information, which may be stored to the index area of the multi-frame thermal image document, and then the subsequent dynamic record is performed.

The part information, the analysis area or the analysis result is associated and recorded with the thermal imaging data, thereby facilitating the subsequent batch analysis.

According to the above, based on the selection of the object information, the proper reference image can be selected as the photographing reference, thereby improving the photographing quality. The analysis area is configured according to the specified part having the specified position relation with the reference image, thereby ensuring the accuracy of the configuration of the analysis area. The specified part corresponds to the part information, thereby allowing the prearranged analysis mode to be more accurate and avoiding mistakes. Since the part information is displayed with the analysis area together, the users can examine the photographed part more intuitively. Since the part information, the analysis area, and the analysis result are displayed together, the users can intuitively see the analysis result with the part information. The thermal imaging data is associated and recorded with the object information, the information related to the reference image, the information related to the part information, the information related to the analysis area, the information related to the analysis mode, or a combination thereof, thereby facilitating the follow-up analysis, examination, and batch processing. When the information related to the part information is associated, the subsequent batch processing is particularly facilitated.

The predetermined analysis mode can be arranged according to the part information and/or the part number, as shown in FIG. 6. Thus, mistakes may be avoided. When arranging the analysis mode, the users may be easy to understand the analysis mode to which the similar part information corresponds, and the workload of calling and writing is small. In one word, the first embodiment is one preferred embodiment. Any product executing this embodiment of this invention may not achieve all of the above advantages at the same time.

Other Embodiments

The embodiment of this invention is not limited to a portable thermal image photographing device, and may be applied to different kinds of online thermal image photographing devices. The function of photographing to acquire the thermal imaging data is not necessary in the invention. This invention may also be applied to a thermal image processing device receiving the thermal imaging data from outside and processing the thermal imaging data. The thermal image processing device such as a computer, a personal digital assistant, or a display matched with a thermal image photographing device with a photographing function, may be as an example of the device for analyzing thermal images, for configuring and arranging the analysis area of the thermal imaging data. In one example, for the thermal imaging data acquired from the thermal image document selected by a user, the configuration of the reference image, the part information, and the corresponding analysis area may be performed.

Further, the part information is not limited to correspond to one specified part, and the same part information may correspond to a plurality of specified parts (for example, a bushing may correspond to two specified parts that are two frames).

Preferably, the part information is expressed as the text of the part information, such as Chinese characters, while the part information is not limited to Chinese characters etc. The language corresponds to the users may be adopted, or the letters on behalf of the meaning of the part information may also be adopted.

In the invention, the program recorded on the storage device may be executed to perform by the computer (such as a CPU or a MPU) of the system or equipment with the function in the above embodiment, and the computer of the system or equipment may read and execute the program recorded on the storage device to perform the function in the above embodiment. To achieve the objective, the program acquired from the network or the record medium (such as a computer readable medium) as the storage device may be provided for the computer.

This invention provides a computer program, and digital signals composed by the computer program are recorded on a computer readable storage medium, such as a hard disk or a memory. The program is executed to perform the following steps:

an acquiring step for acquiring thermal imaging data;

a reference image display controlling step for controlling to display a reference image with a specified position parameter in an infrared thermal image, the reference image reflecting specified morphological characters of a photographed object;

an analysis area setting step for setting an analysis area that is associated with the information related to part information.

This invention provides a computer program, and digital signals composed by the computer program are recorded to a computer readable storage medium, such as a hard disk or a memory. The program is executed to perform the following steps:

a reference image display controlling step for controlling to display a reference image reflecting specified morphological characters of a photographed object;

a selecting step for selecting part information;

an analysis area configuring step for configuring a specified position relation between a specified part and a reference image, or the specified position relation between the specified part and the reference image and constituted data of an analysis area;

a recording step for recording the reference image in association with the configured specified part and the corresponding part information.

The embodiment of this invention further provides a readable storage medium storing a computer program for electrical data exchange. The computer program allows a computer in the thermal imaging device to perform the following steps:

an acquiring step for acquiring thermal imaging data;

a reference image display controlling step for controlling to display a reference image with a specified position parameter in an infrared thermal image, the reference image reflecting specified morphological characters of a photographed object;

an analysis area setting step for setting an analysis area that is associated with the information related to part information.

The embodiment of this invention further provides a readable storage medium storing a computer program for electrical data exchange. The computer program allows a computer in the thermal imaging device to perform the following steps:

an acquiring step for acquiring thermal imaging data;

a display controlling step for displaying a reference image, an analysis area, information related to part information, and an infrared thermal image generated by the acquired thermal imaging data together, according to constituted data of the determined reference image, a position parameter of the reference image, constituted data of the analysis area, a position parameter of the analysis area, and the information related to the part information to which the analysis area corresponds, the reference image and the analysis area are displayed in the infrared thermal image, and the reference image reflects specified morphological characters of a photographed object.

Although the function block in the figures may be realized via hardware, software, or a combination thereof, the function block may be not necessary to be realized in one-by-one mode. For example, one software or hardware unit may be used for realizing multiple function blocks, or multiple software or hardware units may be used for realizing one function block. In addition, the processing and control functions of parts or whole in the embodiments may be realized via a special-use circuit, a general processor, or a programmable FPGA.

In addition, in the embodiment, the electric power industry as the scene is taken for example, and different fields of the infrared detection are also applied.

The above description is just detailed embodiments of the invention, and different examples and description does not limit the substantive contents of the invention. After reading the description, persons having ordinary skill in the art may make various modifications and changes without departing from the scope and spirit of the invention.

What is claimed is:

1. A device for analyzing thermal images, wherein the device comprises:

an acquiring unit for acquiring thermal imaging data;

an object information selecting unit for selecting object information;

one or more object information, data of a reference image, information related to a part, an analysis area corresponding to the information related to a part, an analysis mode associated with the information related to a part, a specified position relation between the reference image and the analysis area, all associated with the object information, being stored in a storage medium;

the reference image being associated with at least two information related to a part, each information related to a part being associated with respective analysis area, and respective analysis mode;

the information related to a part representing information corresponding to a part of a photographed object;

a display controlling unit for controlling to display the reference image in an infrared thermal according to the data of the reference image, the data of the reference image is determined according to the data of the reference image associated with the selected object information;

an analysis area setting unit for setting a shape of an analysis area and a position parameter of the analysis area, the analysis area corresponding to information related to a part;

a thermal image analyzing unit for analyzing the analysis area corresponding to the information related to a part according to the analysis mode associated with the information related to a part;

the analyzing unit comprises a diagnosing unit for analysis according to the specified analysis mode and acquiring the analysis result, the analysis mode comprises a diagnosis rule, and the analysis result comprises a diagnosis result corresponding to the information related to a part;

the display controlling unit for displaying the object information, the analysis area and the information related to the information related to a part corresponding to the analysis area, the diagnosis result and the information related to a part corresponding thereto and an infrared thermal image generated by the acquired thermal imaging data together, or displaying the diagnosis result acquired according to the analysis area, the information related to the information related to a part corresponding to the analysis area, and the infrared thermal image generated by the acquired thermal imaging data together;

the device for analyzing thermal images is a portable device;

different part information corresponds to different shapes of the analysis area, and the analysis mode is arranged according to the different shapes of the analysis area;

the position parameter of the analysis area located in the reference image is acquired according to processing for the reference image, and the part information to which different processing rules correspond is prepared in advance;

a specified part is a base point, and the analysis area is configured by using the base point as a center of the shape thereof.

2. The device for analyzing thermal images according to claim 1, wherein the display controlling unit is used for controlling to display the reference image in the infrared thermal image, according to the data of the determined reference image and a position parameter of the reference image.

3. The device for analyzing thermal images according to claim 2, wherein the set analysis area and the displayed reference image satisfy the specified position relation between the reference image and the specified part corresponding to the information related to the information related to a part.

4. The device for analyzing thermal images according to claim 1, wherein the analysis area comprises a corresponding number, and the number comprises the information related to the information related to a part to which the analysis area corresponds.

5. The device for analyzing thermal images according to claim 1, wherein the shape of the analysis area is acquired according to the data associated with the information related to the information related to a part.

6. The device for analyzing thermal images according to claim 1, wherein the device further comprises:
the thermal image analyzing unit for analysis based on the set analysis area according to the specified analysis mode, to acquire the analysis result.

7. The device for analyzing thermal images according to claim 6, wherein the analysis mode comprises the information related to the information related to a part;
the analysis mode associated with the analysis area corresponding to the information related to a part is prestored in the storage medium, and the analysis mode comprises the information related to the information related to a part.

8. The device for analyzing thermal images according to claim 1, wherein the device further comprises:
the displayed reference image and the set analysis area are set according to the specified position relation between the reference image and the specified part corresponding to the information related to a part associated with the selected object information.

9. The device for analyzing thermal images according to claim 8, wherein the storage medium stores the analysis mode associated with the information related to a part;
and the analysis area is set according to the specified part corresponding to the information related to the information related to a part.

10. The device for analyzing thermal images according to claim 1, wherein the device further comprises:
the specified position relation between the displayed reference image and the set analysis area satisfy the specified position relation between the analysis area and the reference image associated with the selected object information.

11. The device for analyzing thermal images according to claim 1, wherein the information related to a part comprises a part information, a part number corresponding to the part information, or the part information and the part number corresponding to the part information; and the part information at least comprises information of one or more of the followings: a component, a photographing part, a photographing angle.

12. The device for analyzing thermal images according to claim 11, wherein an identifier of the part information allows a user to distinguish the part information of a photographed object represented by the identifier; the part number is associated with the part information in advance, or the part number is generated according to the part information, or the part number uniquely corresponds to the part information, or the part number represents identity information of the part information.

13. The device for analyzing thermal images according to claim 1, wherein the device further comprises:
a recording unit for recording specified recorded information with the thermal imaging data and/or data acquired after specified processing for the thermal imaging data, the specified recorded information comprising one or more of the following:
1) object information;
2) information related to a part;
3) information related to the analysis area;
4) information related to the analysis mode;
5) analysis result.

14. A method for analyzing thermal images, wherein the method comprises:
an acquiring step for acquiring thermal imaging data;
an object information selecting step for selecting object information;
one or more object information, data of a reference image, information related to a part, an analysis area corresponding to the information related to a part, an analysis mode associated with the information related to a part, a specified position relation between the reference image and the analysis area, all associated with the object information, being stored in a storage medium;
the reference image being associated with at least two information related to a part, each information related to a part being associated with respective analysis area, and respective analysis mode;
the information related to a part representing a corresponding part of a photographed object associated with the information related to a part;
a display controlling step for controlling to display the reference image in an infrared thermal according to the data of the reference image, the data of the reference image is determined according to the data of the reference image associated with the selected object information;
an analysis area setting step for setting a shape of an analysis area and a position parameter of the analysis area, the analysis area corresponding to information related to a part;
a thermal image analyzing step for analyzing the analysis area corresponding to the information related to the information related to a part according to the analysis mode associated with the information related to a part;
the analyzing unit comprises a diagnosing step for analysis according to the specified analysis mode and acquiring the analysis result, the analysis mode comprises a diagnosis rule, and the analysis result comprises a diagnosis result corresponding to the information related to a part;

the display controlling step for displaying the object information, the analysis area and the information related to a part corresponding to the analysis area, the diagnosis result and the information related to a part corresponding thereto and an infrared thermal image generated by the acquired thermal imaging data together, or displaying the diagnosis result acquired according to the analysis area, the information related to the information related to a part corresponding to the analysis area, and the infrared thermal image generated by the acquired thermal imaging data together;

the method for analyzing thermal images is performed by a portable device for analyzing thermal images;

different part information corresponds to different shapes of the analysis area, and the analysis mode is arranged according to the different shapes of the analysis area;

the position parameter of the analysis area located in the reference image is acquired according to processing for the reference image, and the part information to which different processing rules correspond is prepared in advance;

a specified part is a base point, and the analysis area is configured by using the base point as a center of the shape thereof.

15. The method for analyzing thermal images according to claim 14, wherein the display controlling step is used for controlling to display the reference image in the infrared thermal image, according to the data of the determined reference image and a position parameter of the reference image.

16. The method for analyzing thermal images according to claim 14, wherein the analysis area comprises a corresponding number, and the number comprises the information related to a part to which the analysis area corresponds.

17. The method for analyzing thermal images according to claim 14, wherein the method further comprises:

the thermal image analyzing step for analysis based on the set analysis area according to a specified analysis mode, to acquire the analysis result; and the analysis mode associated with the analysis area corresponding to the information related to the information related to a part is prestored in the storage medium, and the analysis mode comprises the information related to a part.

* * * * *